United States Patent
Dong

(10) Patent No.: US 12,177,138 B2
(45) Date of Patent: Dec. 24, 2024

(54) METHOD, DEVICE AND STORAGE MEDIUM FOR TRANSMITTING DATA

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/767,373

(22) PCT Filed: Oct. 11, 2019

(86) PCT No.: PCT/CN2019/110677
§ 371 (c)(1),
(2) Date: Apr. 7, 2022

(87) PCT Pub. No.: WO2021/068213
PCT Pub. Date: Apr. 15, 2021

(65) Prior Publication Data
US 2024/0106581 A1  Mar. 28, 2024

(51) Int. Cl.
*H04L 5/00* (2006.01)
*H04W 84/12* (2009.01)

(52) U.S. Cl.
CPC .......... *H04L 5/0005* (2013.01); *H04W 84/12* (2013.01)

(58) Field of Classification Search
CPC ............................... H04L 5/005; H04W 84/12
See application file for complete search history.

(56) References Cited

U.S. PATENT DOCUMENTS

| | | | |
|---|---|---|---|
| 10,136,435 B1* | 11/2018 | Zheng | H04L 5/0007 |
| 2017/0094655 A1* | 3/2017 | Dai | H04W 72/21 |
| 2020/0077417 A1* | 3/2020 | Seok | H04W 28/04 |
| 2020/0314920 A1* | 10/2020 | Seok | H04W 74/0808 |
| 2021/0029766 A1* | 1/2021 | Zhang | H04W 76/15 |

FOREIGN PATENT DOCUMENTS

| | | |
|---|---|---|
| CN | 105517045 A | 4/2016 |
| CN | 105897579 A | 8/2016 |

OTHER PUBLICATIONS

PCT/CN2019/110677 International Search Report, dated Jul. 14, 2020 2 pages.

* cited by examiner

*Primary Examiner* — Derrick V Rose
(74) *Attorney, Agent, or Firm* — Cozen O'Connor

(57) ABSTRACT

A method for transmitting data between a data transmitter and a data receiver in a wireless local area network (WLAN) includes generating one or more data frames to be transmitted; and transmitting the one or more data frames on one or more frequency bands, in which the one or more frequency bands have the same sequence number and the sequence number is configured to identify the one or more data frames.

19 Claims, 10 Drawing Sheets

METHOD, DEVICE AND STORAGE MEDIUM FOR TRANSMITTING DATA

CROSS-REFERENCE TO RELATED APPLICATION

This application is a national phase of International Application No. PCT/CN2019/110677, filed on Oct. 11, 2019, the entire content of which is incorporated herein by reference.

TECHNICAL FIELD

The disclosure relates to the field of wireless data transmission, and more particularly, to a method for transmitting data and a device for transmitting data.

BACKGROUND

IEEE established a study group (SG) to study next-generation mainstream wireless fidelity (Wi-Fi) technologies, to improve an access rate and throughput of Wi-Fi technologies and the like wireless local area network (WLAN) technologies.

In related Wi-Fi technologies, a multi-link (ML) technique is proposed for transmitting data to increase a data transmission rate and reduce a delay. Therefore, it has become a research hotspot how to employ the ML manner to transmit data.

SUMMARY

According to a first aspect of embodiments of the disclosure, a method for transmitting data is provided. The method includes: generating one or more data frames to be transmitted; and transmitting the one or more data frames on one or more frequency bands, in which the one or more frequency bands have the same sequence number and the sequence number is configured to identify the one or more data frames.

According to a second aspect of embodiments of the disclosure, a method for transmitting data is provided. The method includes: receiving one or more data frames on one or more frequency bands, in which the one or more frequency bands have the same sequence number and the sequence number is configured to identify the one or more data frames; and sequentially decoding the received one or more data frames on the one or more frequency bands by an order of frequencies from high to low or from low to high.

According to a third aspect of embodiments of the disclosure, a device for transmitting data is provided. The device includes: a processor; and a memory for storing instructions executable by the processor; in which the processor is configured to perform the method for transmitting data described in the first aspect or in the second aspect.

According to a fourth aspect of embodiments of the disclosure, a non-transitory computer-readable storage medium is provided. The storage medium has stored therein instructions that, when executed by a processor of a device terminal, causes the device terminal to perform the method for transmitting data described in the first aspect or in the second aspect It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
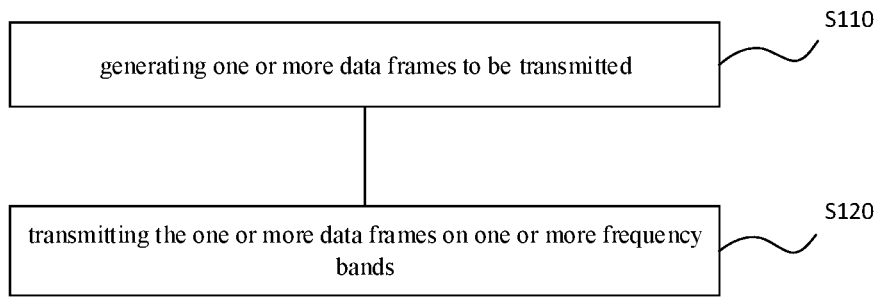
FIG. 1 is a flow chart illustrating a method for transmitting data according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

A method for transmitting data, provided in the disclosure, is applicable to a wireless local area network (WLAN) communication system including a data transmitter and a data receiver. The data transmitter and the data receiver may be a station (STA) or an access point (AP). The forward transmission and back transmission for data are performed between the data transmitter and the data receiver through the WLAN.

The STA in the disclosure may be understood as a user terminal in the WLAN. The user terminal may be referred to as a user equipment (UE), a mobile station (MS), a mobile terminal or the like. The user terminal may be a device that provides speech and/or data connectivity for a user. For example, the terminal may be a handheld device, a vehicle-mounted device or the like, with a wireless connection function. At present, some examples of terminals are: smart phones (mobile phones), pocket personal computers (PPCs), handheld computers, personal digital assistants (PDAs), notebook computers, tablet computers, wearable devices, Internet of Things (IoT) clients, in-vehicle devices or the like.

In the disclosure, AP refers to an equipment, a routers or the like that the user terminal of the WLAN accesses the network.

In the related art, the IEEE 802.11 standard is used to transmit data packages between the STA and the AP. At present, IEEE802.11 established a study group (SG) IEEE802.11be to study next-generation mainstream (IEEE802.11a/b/g/n/ac/ax) wireless fidelity (Wi-Fi) technologies. The research scope is transmission of 320 MHz bandwidth, aggregation and coordination of a plurality of frequency bands and the like. The proposed prospect is to increase the rate and throughput by at least four times compared with the existing 802.11ax. Its scenarios include video transmission, augmented reality (AR), virtual reality (VR), etc.

The aggregation and coordination of the plurality of frequency bands refers to simultaneous data transmission in the plurality of frequency bands or the plurality of bandwidths in the same frequency band. For example, the data transmission in three frequency bands of 2.4 GHz, 5.8 GHz and 6-7 GHz may be performed simultaneously. The simultaneous data transmission in the plurality of frequency bands or the plurality of bandwidths in the same frequency band can be understood as the ML data transmission.

The disclosure provides a method for transmitting data. A data transmitter generates one or more data frames to be transmitted and transmits the one or more data frames on one or more frequency bands, in which the one or more frequency bands have the same sequence number (SN) and the SN is configured to identify the one or more data frames. In the disclosure, the one or more data frames generated can be transmitted on the one or more frequency bands and each frequency band is assigned to the same number for identifying the one or more data frames, realizing a ML data transmission, improving a throughput during data transmission and improving an effective utilization of spectrum.

FIG. 1 is a flow chart illustrating a method for transmitting data according to some embodiments. As illustrated in FIG. 1, the method for transmitting data is applicable to a data transmitter. The data transmitter may be an STA or an AP. The method includes the following.

In S110, one or more data frames to be transmitted are generated.

In the disclosure, the one or more data frames to be transmitted include a single data frame or a plurality of data frames to be transmitted successively.

In S120, the one or more data frames are transmitted on one or more frequency bands.

In the disclosure, the one or more frequency bands have the same SN and the SN is configured to identify the one or more data frames.

In the disclosure, if the one or more data frames include the single data frame, data blocks with the same SN in the single data frame are transmitted on the one or more frequency bands. If the one or more data frames include the plurality of data frames to be transmitted successively, data subframes with the same SN in the plurality of data frames are transmitted on the one or more frequency bands.

In the disclosure, on the one hand, the one or more frequency bands for transmitting the data blocks in the single data frame include a plurality of frequency bands with different frequencies. On the other hand, the one or more frequency bands for transmitting the data blocks in the single data frame include the same frequency band with different frequency bandwidths. The bandwidth frequency set in each frequency band may be the same or different. For example, it is assumed that if the bandwidth frequency set in each frequency band is different, the bandwidth frequency set in the 2.4 GHz frequency band is 20 MHz, the bandwidth frequency set in the 5.8 GHz frequency band is 40 MHz and the bandwidth frequency set in the 6-7 GHz frequency band is 80 MHz. Or it is assumed that if the bandwidth frequency set in each frequency band is the same, the bandwidth frequencies set in the 2.4 GHz frequency band, the 5.8 GHz frequency band and the 6-7 GHz frequency band all are 20 MHz, 40 MHz or 80 MHz.

In the disclosure, the one or more frequency bands for transmitting the data subframes in the plurality of data frames to be transmitted successively include a plurality of frequency bands with different frequencies or the same frequency band with different frequency bandwidths, in which the bandwidth frequency set in each frequency band may be the same or different. For example, it is assumed that if the bandwidth frequency set in each frequency band is different, the bandwidth frequency set in the 2.4 GHz frequency band is 20 MHz, the bandwidth frequency set in the 5.8 GHz frequency band is 40 MHz and the bandwidth frequency set in the 6-7 GHz frequency band is 80 MHz. Or it is assumed that if the bandwidth frequency set in each frequency band is the same, the bandwidth frequencies set in the 2.4 GHz frequency band, the 5.8 GHz frequency band and the 6-7 GHz frequency band all are 20 MHz, 40 MHz or 80 MHz.

In the disclosure, the method for transmitting data satisfies requirements of assigning SNs to data frames in the ML communication and also satisfies requirements of the IEEE802.11be standard, so that the ML data transmission can be realized between the data transmitter and the data receiver, improving the throughput of the system during data transmission. At the same time, the period for occupying frequency bands or different bandwidths in the frequency band, during data transmission, is reduced, thereby increasing the effective utilization rate of the spectrum.

Figure 2:
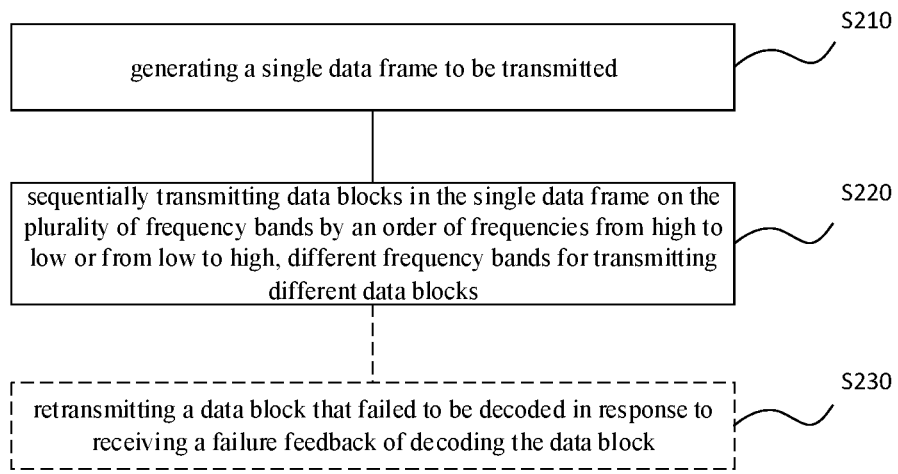
FIG. 2 is a flow chart illustrating a method for transmitting data, applicable to a data transmitter, according to some embodiments.

FIG. 2 is a flow chart illustrating a method for transmitting data, in which the one or more frequency bands for transmitting data blocks in the single data frame include a plurality of frequency bands with different frequencies, according to some embodiments. As illustrated in FIG. 2, the method for transmitting data is applicable to the data transmitter and includes S210 to S220.

In S210, a single data frame to be transmitted is generated.

In S220, data blocks in the single data frame are sequentially transmitted on the plurality of frequency bands by an order of frequencies from high to low or from low to high, in which different frequency bands are for transmitting different data blocks.

In an example, it is assumed that the data transmitter performs data transmission in three frequency bands and the frequency of each frequency band ranges from low to high as 2.4 GHz, 5.8 GHz and 6-7 GHz. In these three frequency bands, the data transmitter sets the same SN 1 for each frequency band. Since data transmission is performed in three frequency bands, the single data frame is divided into three data blocks, the SN of each data block is 1 and each data block is numbered, for example, data block 1, data block 2 and data block 3. The serial number and the SN are labeled by the sequence control field.

Figure 3:
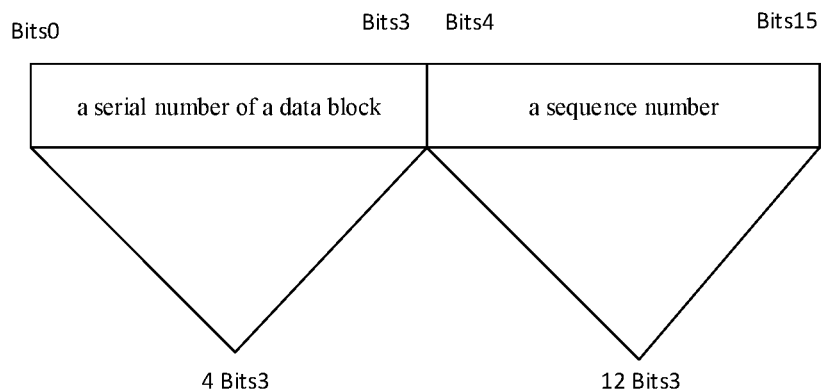
FIG. 3 is a schematic diagram illustrating a serial number and a sequence number of a data block, labeled with a sequence control field, according to some embodiments.

FIG. 3 is a schematic diagram illustrating a serial number and an SN of a data block, labeled with a sequence control field, according to some embodiments. As illustrated in FIG. 3, the serial number is labeled by the first 4 bytes of the sequence control field and the SN is labeled by the fifth byte to the twelfth byte of the sequence control field.

In the disclosure, the plurality of numbered data blocks in the single data frame can be sequentially transmitted on the plurality of frequency bands by the order of frequencies from high to low or from low to high. For example, data block 1 is transmitted on the 2.4 GHz frequency band, data block 2 is transmitted on the 5.8 GHz frequency band and data block 3 is transmitted on the 6-7 GHz frequency band. Or data block 3 is transmitted on the 2.4 GHz frequency band, data block 2 is transmitted on the 5.8 GHz frequency band and data block 1 is transmitted on the 6-7 GHz frequency band.

In an implementation manner, after the data receiver receives the data blocks from the data transmitter, the data receiver decodes the data blocks. When the decoding fails, a failure feedback message of decoding a data block may be fed back to the data transmitter. The failure feedback message of decoding the data block includes the initial-transmission SN of the data block that failed to be decoded. So that the data transmitter carries the initial-transmission SN of the data block when retransmitting the data block that failed to be decoded to the data receiver.

In the method for transmitting data, in which the one or more frequency bands for transmitting the data blocks in the single data frame include the plurality of frequency bands with different frequencies, as illustrated in FIG. 2, the method further includes the following.

In S230, a data block that failed to be decoded is retransmitted in response to receiving a failure feedback of decoding the data block.

In the disclosure, the retransmitted data block has the same SN as the data block that is initially transmitted.

It should be understood that the content shown by the dotted line in FIG. 2 is an optional action.

Figure 4:
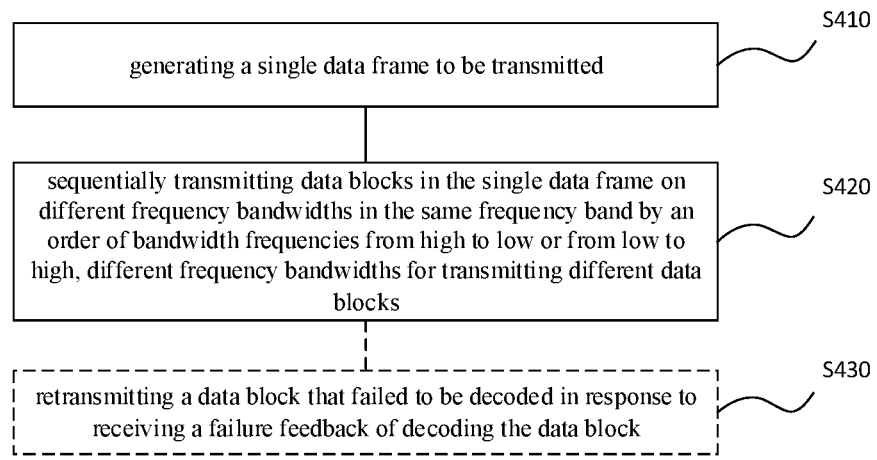
FIG. 4 is a flow chart illustrating another method for transmitting data, applicable to a data transmitter, according to some embodiments.

FIG. 4 is a flow chart illustrating a method for transmitting data, in which the one or more frequency bands for transmitting data blocks in the single data frame include the same frequency band with different frequency bandwidths. As illustrated in FIG. 4, the method for transmitting data is applicable to the data transmitter and includes S410 to S420.

In S410, a single data frame to be transmitted is generated.

In S420, data blocks in the single data frame are sequentially transmitted on different frequency bandwidths in the same frequency band by an order of bandwidth frequencies from high to low or from low to high, in which different frequency bandwidths are for transmitting different data blocks.

In the disclosure, it is assumed that the data transmitter performs data transmission on three different frequency bandwidths in one frequency band and the frequency of each bandwidth ranges from low to high from 2.41 GHz to 2.43 GHz, 2.44 GHz to 2.46 GHz and 2.47 GHz to 2.49 GHz. Under these three different frequency bandwidths, the data transmitter maintains the same SN for each different frequency bandwidth and is set to 1. It is assigned a numbered data block to each frequency band and the data blocks in the single data frame are sequentially transmitted on the three frequency bandwidths by the order of bandwidth frequencies from high to low or from low to high. For example, data block 1 is transmitted on the 2.41 GHz~2.43 GHz frequency bandwidth, data block 2 is transmitted on the 2.44 GHz~2.46 GHz frequency bandwidth, and data block 3 is transmitted on the 2.47 GHz~2.49 GHz frequency bandwidth. Or data block 3 is transmitted on the 2.41 GHz~2.43 GHz frequency bandwidth, data block 2 is transmitted on the 2.44 GHz~2.46 GHz frequency bandwidth, and data block 1 is transmitted on the 2.47 GHz~2.49 GHz frequency bandwidth.

In an implementation manner, after the data receiver receives the data blocks from the data transmitter, the data receiver decodes the data blocks. When the decoding fails, a failure feedback message of decoding a data block may be fed back to the data transmitter. The failure feedback message of decoding the data block includes the initial-transmission SN of the data block that failed to be decoded. So that the data transmitter carries the initial-transmission SN of the data block when retransmitting the data block that failed to be decoded to the data receiver.

In the method for transmitting data, in which the one or more frequency bands for transmitting data blocks in the single data frame include the same frequency band with different frequency bandwidths, the method further includes the following.

In S430, a data block that failed to be decoded is retransmitted in response to receiving a failure feedback of decoding the data block.

In the disclosure, the retransmitted data block has the same SN as the data block that is initially transmitted.

It should be understood that the content shown by the dotted line in FIG. 4 is an optional action.

Figure 5:
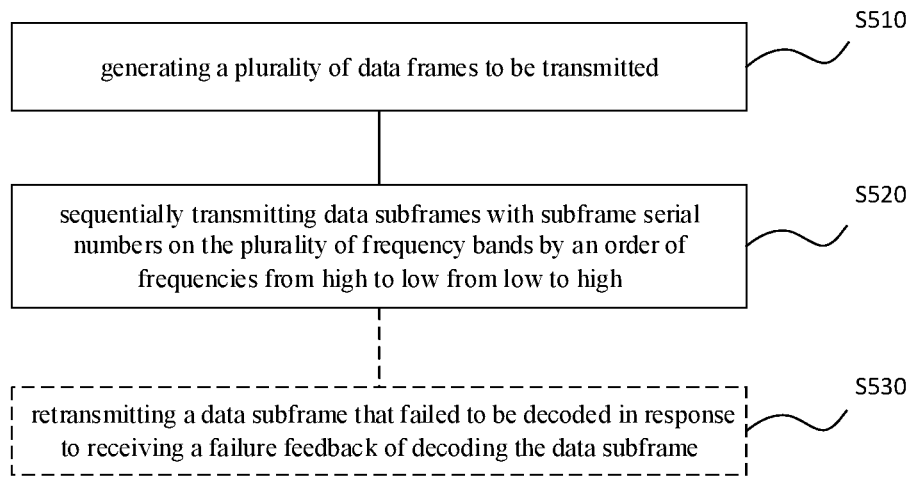
FIG. 5 is a flow chart illustrating another method for transmitting data, applicable to a data transmitter, according to some embodiments.

FIG. 5 is a flow chart illustrating a method for transmitting data, in which the one or more frequency bands for transmitting data subframes in a plurality of data frames to be transmitted successively include a plurality of frequency bands with different frequencies, according to some embodiments. As illustrated in FIG. 5, the method for transmitting data is applicable to the data transmitter and includes S510 to S520.

In S510, a plurality of data frames to be transmitted are generated.

In S520, data subframes with subframe serial numbers are sequentially transmitted on the plurality of frequency bands by an order of frequencies from high to low or from low to high.

In the disclosure, the data subframes with the same SN in the plurality of data frames are sequentially transmitted on the plurality of frequency bands and the data subframe has a corresponding subframe serial number.

In an example, it is assumed that the data transmitter performs data transmission in three frequency bands and the frequency of each frequency band ranges from low to high as 2.4 GHz, 5.8 GHz and 6-7 GHz. In these three frequency bands, the data transmitter sets the same SN 1 for each frequency band. Since data transmission is performed in three frequency bands, the data subframes in the plurality of data frames to be transmitted successively are divided into three parts: subframe serial numbers of the first part of the data subframes are serial numbers from 1 to n, subframe serial numbers of the second part of the data subframes are serial numbers from n+1 to 2n+1, and subframe serial numbers of the third part of the data subframes are serial numbers from 2n+2 to 3n+2.

In the disclosure, a part of data subframes are allocated to each frequency band, and the data subframes with subframe serial numbers are sequentially transmitted on the plurality of frequency bands by the order of frequencies from high to low or from low to high. For example, the first part of the data subframes is transmitted on the 2.4 GHz frequency band, the second part of the data subframes is transmitted on the 5.8 GHz frequency band, and the third part of the data subframes is transmitted on the 6-7 GHz frequency band. Or the third part of the data subframes is transmitted on the 2.4 GHz frequency band, the second part of the data subframes is transmitted on the 5.8 GHz frequency band, and the first part of the data subframe is transmitted on the 6-7 GHz frequency band.

In an implementation manner, after the data receiver receives the data subframes from the data transmitter, the data receiver decodes the data subframes. When the decoding fails, a failure feedback message of decoding a data subframe may be fed back to the data transmitter. The failure feedback message of decoding the data subframe includes the initial-transmission SN of the data subframe that failed to be decoded. So that the data transmitter carries the initial-transmission SN of the data subframe when retransmitting the data subframe that failed to be decoded to the data receiver.

In the method for transmitting data, in which the one or more frequency bands for transmitting data subframes in a plurality of data frames to be transmitted successively include a plurality of frequency bands with different frequencies, according to some embodiments, the method further includes the following.

In S530, a data subframe that failed to be decoded is retransmitted in response to receiving a failure feedback of decoding the data subframe.

In the disclosure, the retransmitted data subframe has the same SN as the data subframe that is initially transmitted.

It should be understood that the content shown by the dotted line in FIG. 5 is an optional action.

Figure 6:
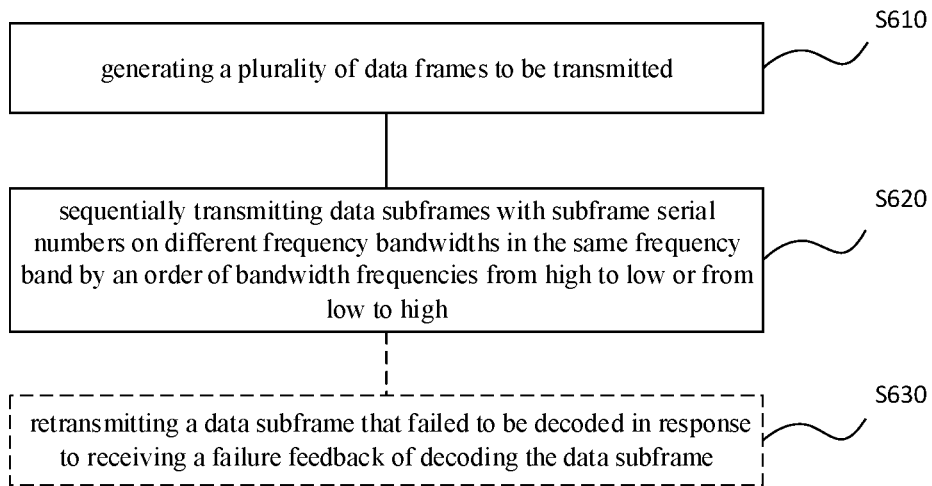
FIG. 6 is a flow chart illustrating another method for transmitting data, applicable to a data transmitter, according to some embodiments.

FIG. 6 is a flowchart illustrating a method for transmitting data, in which the one or more frequency bands for transmitting data subframes in a plurality of data frames to be transmitted successively include the same frequency band with different frequency bandwidths. As illustrated in FIG. 6, the method for transmitting data is applicable to the data transmitter and includes S610 to S620.

In S610, a plurality of data frames to be transmitted are generated.

In S620, data subframes with subframe serial numbers are sequentially transmitted on different frequency bandwidths in the same frequency band by an order of bandwidth frequencies from high to low or from low to high.

In the disclosure, the data subframes with the same SN in the plurality of data frames are sequentially transmitted on the plurality of frequency bands and the data subframe has a corresponding subframe serial number.

In the disclosure, a plurality of data subframes with successive subframe serial numbers are transmitted on each of the frequency bandwidths.

In the disclosure, it is assumed that the data transmitter performs data transmission on different frequency bandwidths in the same frequency band and the frequency of each bandwidth ranges from low to high from 2.41 GHz to 2.43 GHz, 2.44 GHz to 2.46 GHz and 2.47 GHz to 2.49 GHz. Under these three different frequency bandwidths, the data transmitter maintains the same SN for each different frequency bandwidth and is set to 1. Because the data transmission is carried out in different frequency bandwidths, the data subframes in the plurality of data frames to be transmitted successively are divided into three parts: subframe serial numbers of the first part of the data subframes are serial numbers from 1 to n, subframe serial numbers of the second part of the data subframes are serial numbers from n+1 to 2n+1, and subframe serial numbers of the third part of the data subframes are serial numbers from 2n+2 to 3n+2.

In the disclosure, the data transmitter allocates a part of data subframes with subframe serial numbers for each different frequency bandwidth. The data subframes with subframe serial numbers are sequentially transmitted on each different frequency bandwidth by the order of frequencies from high to low or from low to high. For example, the first part of the data subframes is transmitted on the 2.41 GHz~2.43 GHz frequency bandwidth, the second part of the data subframes is transmitted on the 2.44 GHz~2.46 GHz frequency bandwidth, and the third part of the data subframes is transmitted on the 2.47 GHz~2.49 GHz frequency bandwidth. Or the third part of the data subframes is transmitted on the 2.41 GHz~2.43 GHz frequency bandwidth, the second part of the data subframes is transmitted on the 2.44 GHz~2.46 GHz frequency bandwidth, and the first part of the data subframes is transmitted on the 2.47 GHz~2.49 GHz frequency bandwidth.

In an implementation manner, after the data receiver receives the data subframes from the data transmitter, the data receiver decodes the data subframes. When the decoding fails, a failure feedback message of decoding a data subframe may be fed back to the data transmitter. The failure feedback message of decoding the data subframe includes the initial-transmission SN of the data subframe that failed to be decoded. So that the data transmitter carries the initial-transmission SN of the data subframe when retransmitting the data subframe that failed to be decoded to the data receiver.

In the method for transmitting data, in which the one or more frequency bands for transmitting data subframes in a plurality of data frames to be transmitted successively include the same frequency band with different frequency bandwidths, according to some embodiments, the method further includes the following.

In S630, a data subframe that failed to be decoded is retransmitted in response to receiving a failure feedback of decoding the data subframe.

In the disclosure, the retransmitted data subframe has the same SN as the data subframe that is initially transmitted.

It should be understood that the content shown by the dotted line in FIG. 6 is an optional action.

Figure 7:
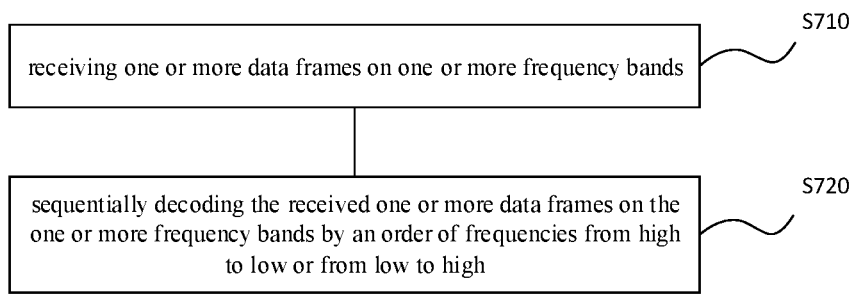
FIG. 7 is a flow chart illustrating another method for transmitting data according to some embodiments.

FIG. 7 is a flow chart illustrating a method for transmitting data according to some embodiments. As illustrated in FIG. 7, the method for transmitting data is applicable to a data receiver.

In S710, one or more data frames are received on one or more frequency bands.

In the disclosure, the data receiver may be an AP or STA.

In the disclosure, the one or more frequency bands have the same SN and the SN is configured to identify the one or more data frames.

In the disclosure, the one or more data frames received by the data receiver include a single data frame or a plurality of data frames to be transmitted successively.

In S720, the received one or more data frames are sequentially decoded on the one or more frequency bands by an order of frequencies from high to low or from low to high.

Figure 8:
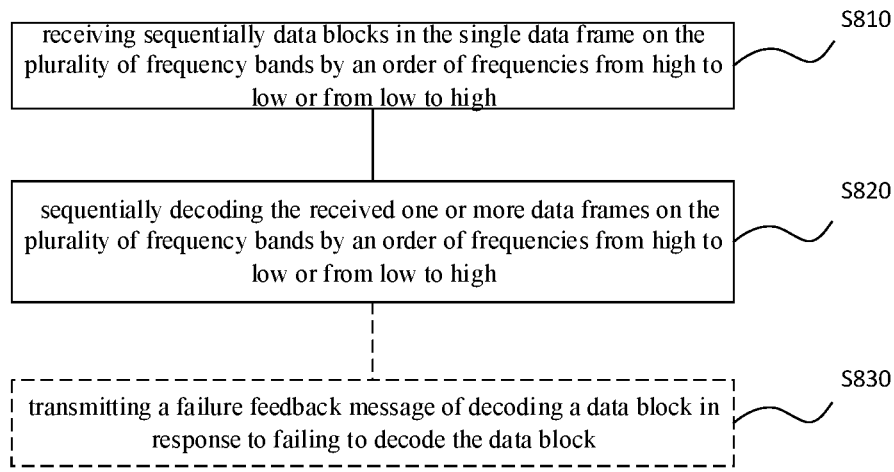
FIG. 8 is a flow chart illustrating a method for transmitting data, applicable to a data receiver, according to some embodiments.

FIG. 8 is a flow chart illustrating a method for transmitting data, in which the one or more frequency bands for transmitting data blocks in the single data frame include a plurality of frequency bands with different frequencies, according to some embodiments. As illustrated in FIG. 8, the method for transmitting data is applicable to the data receiver and includes S810 to S820.

In S810, data blocks in the single data frame are received sequentially on the plurality of frequency bands by an order of frequencies from high to low or from low to high.

In the disclosure, the data receiver sequentially receives the data blocks in the single data frame on the plurality of frequency bands by an order of frequencies from high to low or from low to high, including: the data receiver sequentially receives the data blocks in the single data frame on the plurality of frequency bands by an order of frequencies from high to low, or the data receiver sequentially receives the data blocks in the single data frame on the plurality of frequency bands by an order of frequencies from low to high.

In S820, the received one or more data frames are sequentially decoded on the plurality of frequency bands by an order of frequencies from high to low or from low to high.

In the disclosure, if the data transmitter sequentially transmits the data blocks in the single data frame on the plurality of frequency bands by the order of frequencies from high to low, the data receiver sequentially receives the data blocks in the single data frame on the plurality of frequency bands by the order of frequencies from high to low. For example, the data transmitter transmits data block 1 on the 2.4 GHz frequency band, transmits data block 2 on the 5.8 GHz frequency band, and transmits data block 3 on the 6-7 GHz frequency band. Then the data receiver receives data block 1 on the 2.4 GHz frequency band, receives data block 2 on the 5.8 GHz frequency band, and receives data block 3 on the 6-7 GHz frequency band, and decodes the data blocks according to the order of receiving three data blocks.

In the disclosure, if the data transmitter sequentially transmits the data blocks in the single data frame on the plurality of frequency bands by the order of frequencies from low to high, the data receiver sequentially receives the data blocks in the single data frame on the plurality of frequency bands by the order of frequencies from low to high. For example, the data transmitter transmits data block 3 on the 2.4 GHz frequency band, transmits data block 2 on the 5.8 GHz frequency band, and transmits data block 1 on the 6-7 GHz frequency band. Then the data receiver receives data block 3 on the 2.4 GHz frequency band, receives data block 2 on the 5.8 GHz frequency band, receives data block 1 on the 6-7 GHz frequency band, and decodes the data blocks according to the order of receiving the data blocks.

In an implementation manner, after the data receiver receives the data blocks from the data transmitter, the data receiver decodes the data blocks. When the decoding fails, a failure feedback message of decoding a data block may be fed back to the data transmitter. The failure feedback message of decoding the data block includes the initial-transmission SN of the data block that failed to be decoded. So that the data transmitter carries the initial-transmission SN of the data block when retransmitting the data block that failed to be decoded to the data receiver.

In the method for transmitting data, in which the one or more frequency bands for transmitting the data blocks in the single data frame include the plurality of frequency bands with different frequencies, the method further includes the following.

In 830, a failure feedback message of decoding a data block is transmitted in response to failing to decode the data block.

In the disclosure, the failure feedback message includes an initial-transmission SN of the data block that failed to be decoded.

It should be understood that the content shown by the dotted line in FIG. 8 is an optional action.

Figure 9:
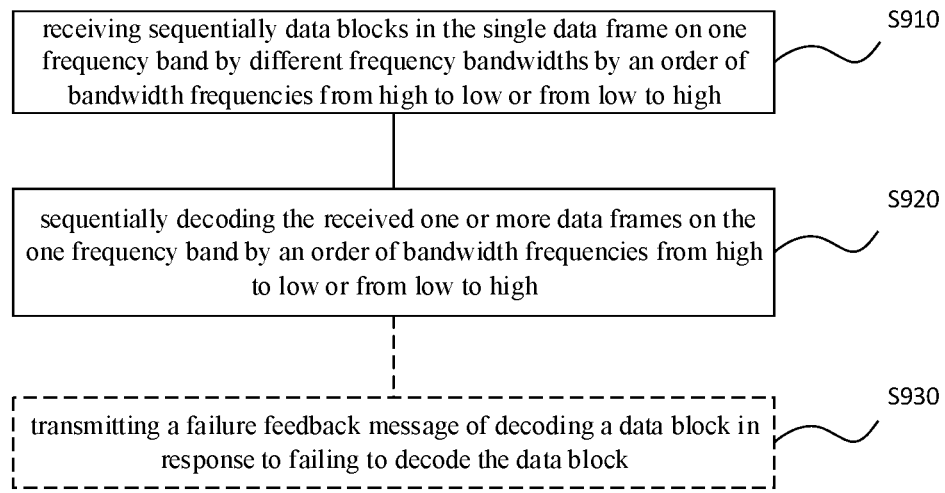
FIG. 9 is a flow chart illustrating another method for transmitting data, applicable to a data receiver, according to some embodiments.

FIG. 9 is a flow chart illustrating a method for transmitting data, in which the one or more frequency bands for transmitting data blocks in the single data frame include the same frequency band with different frequency bandwidths. As illustrated in FIG. 9, the method for transmitting data is applicable to the data receiver and includes S910 to S920.

In S910, data blocks in the single data frame are received sequentially on one frequency band by different frequency bandwidths by an order of bandwidth frequencies from high to low or from low to high.

In the disclosure, the data receiver sequentially receives the data blocks in the single data frame on the one frequency band by different frequency bandwidths by an order of bandwidth frequencies from high to low or from low to high, including: the data receiver sequentially receives the data blocks in the single data frame on the one frequency band by different frequency bandwidths by an order of bandwidth frequencies from high to low, or the data receiver sequentially receives the data blocks in the single data frame on the one frequency band by different frequency bandwidths by an order of bandwidth frequencies from low to high.

In S920, the received one or more data frames are sequentially decoded on the one frequency band by an order of bandwidth frequencies from high to low or from low to high.

In the disclosure, if the data transmitter sequentially transmits the data blocks in the single data frame on the one frequency band by the order of bandwidth frequencies from high to low, the data receiver sequentially receives the data blocks in the single data frame on the one frequency band by the order of bandwidth frequencies from high to low. For example, the data transmitter transmits data block 1 on the 2.41 GHz~2.43 GHz frequency bandwidth, transmits data block 2 on the 2.44 GHz to 2.46 GHz frequency bandwidth, and transmits data block 3 on the 2.47 GHz to 2.49 GHz frequency bandwidth. Then the data receiver receives data block 1 on the 2.41 GHz~2.43 GHz frequency bandwidth, receives data block 2 on the 2.44 GHz~2.46 GHz frequency bandwidth, and receives data block 3 on the 2.47 GHz~2.49 GHz frequency bandwidth, and decodes the data blocks based on the order of receiving the data blocks.

In the disclosure, if the data transmitter sequentially transmits the data blocks in the single data frame on the one frequency band by the order of bandwidth frequencies from low to high, the data receiver sequentially receives the data blocks in the single data frame on the one frequency band by the order of bandwidth frequencies from low to high. For example, the data transmitter transmits data block 3 on the 2.41 GHz~2.43 GHz frequency bandwidth, transmits data block 2 on the 2.44 GHz to 2.46 GHz frequency bandwidth, and transmits data block 1 on the 2.47 GHz to 2.49 GHz frequency bandwidth. Then the data receiver receives data block 3 on the 2.41 GHz~2.43 GHz frequency bandwidth, receives data block 2 on the 2.44 GHz~2.46 GHz frequency bandwidth, and receives data block 1 on the 2.47 GHz~2.49 GHz frequency bandwidth, and decodes the data blocks based on the order of receiving the data blocks.

In an implementation manner, after the data receiver receives the data blocks from the data transmitter, the data receiver decodes the data blocks. When the decoding fails, a failure feedback message of decoding a data block may be fed back to the data transmitter. The failure feedback message of decoding the data block includes the initial-transmission SN of the data block that failed to be decoded. So that the data transmitter carries the initial-transmission SN of the data block when retransmitting the data block that failed to be decoded to the data receiver.

In the method for transmitting data, in which the one or more frequency bands for transmitting data blocks in the single data frame include the same frequency band with different frequency bandwidths, the method further includes the following.

In 930, a failure feedback message of decoding a data block in response to failing to decode the data block.

In the disclosure, the failure feedback message includes an initial-transmission SN of the data block that failed to be decoded.

It should be understood that the content shown by the dotted line in FIG. 9 is an optional action.

Figure 10:
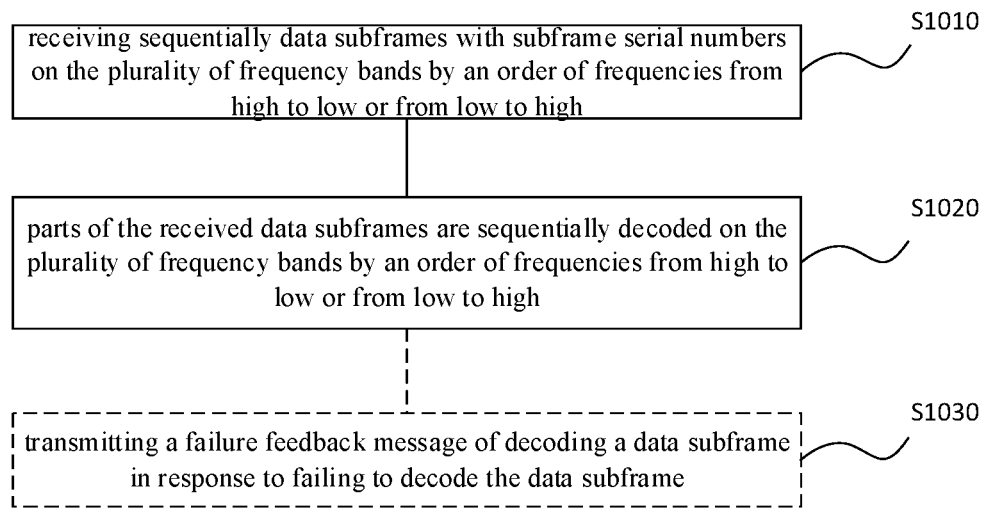
FIG. 10 is a flow chart illustrating another method for transmitting data, applicable to a data receiver, according to some embodiments.

FIG. 10 is a flow chart illustrating a method for transmitting data, in which the one or more frequency bands for transmitting data subframes in a plurality of data frames to be transmitted successively include a plurality of frequency bands with different frequencies, according to some embodiments. As illustrated in FIG. 10, the method for transmitting data is applicable to the data receiver and includes S1010 to S1020.

In S1010, data subframes with subframe serial numbers are received sequentially on the plurality of frequency bands by an order of frequencies from high to low or from low to high.

In the disclosure, the data receiver receives the data subframes with the successive serial frame numbers on each frequency band.

In the disclosure, the one or more frequency bands have the same SN and the SN is configured to identify the one or more data frames.

In the disclosure, the data receiver receives sequentially the data subframes in the plurality of data frames, which are transmitted by the data transmitter, on the plurality of frequency bands by an order of frequencies from high to low or from low to high, including: the data receiver receives sequentially the data subframes in the plurality of data frames on the plurality of frequency bands by an order of frequencies from high to low, which are transmitted sequentially by the data transmitter; or the data receiver receives inversely the data subframes in the plurality of data frames on the plurality of frequency bands by an order of frequencies from low to high, which are transmitted sequentially by the data transmitter.

In S1020, parts of the received data subframes are sequentially decoded on the plurality of frequency bands by an order of frequencies from high to low or from low to high.

In the disclosure, if the data transmitter sequentially transmits the data subframes with the subframe serial numbers by the order of frequencies from high to low on the plurality of frequency bands, the data receiver sequentially receives the data subframes with the subframe serial numbers by the order of frequencies from high to low on the plurality of frequency bands. For example, the data transmitter transmits the first part of data subframes on the 2.4 GHz frequency band, the second part of data subframes on the 5.8 GHz frequency band, and the third part of data subframes on the 6-7 GHz frequency band. Then the data receiver receives the first part of data subframes on the 2.4 GHz frequency band, the second part of data subframes on the 5.8 GHz frequency band, and the third part of data subframes on the 6-7 GHz frequency band, and decodes the data subframes based on the sequence of receiving each part of data subframes and the numbering sequence of each part of data subframes.

In the disclosure, if the data transmitter sequentially transmits the data subframes with the subframe serial numbers by the order of frequencies from low to high on the plurality of frequency bands, the data receiver sequentially receives the data subframes with the subframe serial numbers by the order of frequencies from low to high on the plurality of frequency bands. For example, the data transmitter transmits the third part of data subframes on the 2.4 GHz frequency band, the second part of data subframes on the 5.8 GHz frequency band, and the first part of data subframes on the 6-7 GHz frequency band. Then the data receiver receives the third part of data subframes on the 2.4 GHz frequency band, the second part of data subframes on the 5.8 GHz frequency band, and the first part of data subframes on the 6-7 GHz frequency band, and decodes the data subframes based on the reverse sequence of receiving each part of data subframes and the numbering sequence of each part of data subframes.

In an implementation manner, after the data receiver receives the data subframes from the data transmitter, the data receiver decodes the data subframes. When the decoding fails, a failure feedback message of decoding a data subframe may be fed back to the data transmitter. The failure feedback message of decoding the data subframe includes the initial-transmission SN of the data subframe that failed to be decoded. So that the data transmitter carries the initial-transmission SN of the data subframe when retransmitting the data subframe that failed to be decoded to the data receiver.

In the method for transmitting data, in which the one or more frequency bands for transmitting data subframes in a plurality of data frames to be transmitted successively include a plurality of frequency bands with different frequencies, according to some embodiments, the method further includes the following.

In 1030, a failure feedback message of decoding a data subframe is transmitted in response to failing to decode the data subframe.

In the disclosure, the failure feedback message includes an initial-transmission SN of the data subframe that failed to be decoded, so that the retransmitted data subframe has the same SN as the initial-transmission data subframe.

It should be understood that the content shown by the dotted line in FIG. 10 is an optional action.

Figure 11:
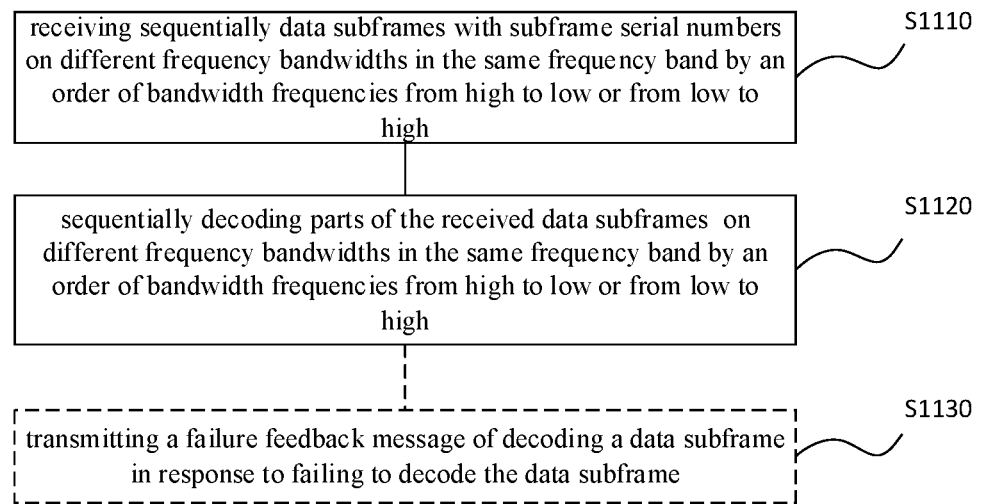
FIG. 11 is a flow chart illustrating another method for transmitting data, applicable to a data receiver, according to some embodiments.

FIG. 11 is a flowchart illustrating a method for transmitting data, in which the one or more frequency bands for transmitting data subframes in a plurality of data frames to be transmitted successively include the same frequency band with different frequency bandwidths. As illustrated in FIG. 11, the method for transmitting data is applicable to the data receiver and includes S1110 to S1120.

In S1110, data subframes with subframe serial numbers are received sequentially on different frequency bandwidths in the same frequency band by an order of bandwidth frequencies from high to low or from low to high.

In the disclosure, the data receiver receives the data subframes with the successive serial frame numbers on each frequency bandwidth.

In the disclosure, the one or more frequency bands have the same SN and the SN is configured to identify the one or more data frames.

In the disclosure, the data receiver receives sequentially the data subframes in the plurality of data frames, which are transmitted by the data transmitter, on the plurality of frequency bands by an order of frequencies from high to low or from low to high, including: the data receiver receives sequentially the data subframes in the plurality of data frames on different frequency bandwidths by an order of frequencies from high to low, or the data receiver receives inversely the data subframes in the plurality of data frames on different frequency bandwidths by an order of frequencies from low to high.

In 1120, parts of the received data subframes are sequentially decoded on different frequency bandwidths in the same frequency band by an order of bandwidth frequencies from high to low or from low to high.

In the disclosure, if the data transmitter sequentially transmits the data subframes with the subframe serial numbers by the order of bandwidth frequencies from high to low on different frequency bandwidths in the same frequency band, the data receiver sequentially receives the data subframes with the subframe serial numbers by the order of bandwidth frequencies from high to low on different frequency bandwidths in the same frequency band. For example, the data bandwidth transmits the first part of data subframes on the 2.41 GHz~2.43 GHz frequency bandwidth, the second part of data subframes on the 2.44 GHz~2.46 GHz frequency bandwidth, and the third part of data subframes on the 2.47 GHz~2.49 GHz frequency bandwidth. Then the data receiver receives the first part of data subframes on the 2.41 GHz~2.43 GHz frequency bandwidth, receives the second part of data subframes on the 2.44 GHz~2.46 GHz frequency bandwidth, and receives the third part of data subframes on the 2.47 GHz~2.49 GHz frequency bandwidth, and decodes the data subframes based on the sequence of receiving each part of data subframes and the numbering sequence of each part of data subframes.

In the disclosure, if the data transmitter sequentially transmits the data subframes with the subframe serial numbers by the order of bandwidth frequencies from low to high on different frequency bandwidths in the same frequency band, the data receiver sequentially receives the data subframes with the subframe serial numbers by the order of bandwidth frequencies from low to high on different frequency bandwidths in the same frequency band. For example, the data transmitter transmits the third part of data subframes on the 2.41 GHz~2.43 GHz frequency bandwidth, the second part of data subframes on the 2.44 GHz~2.46 GHz frequency bandwidth, and the first part of data subframes on the 2.47 GHz~2.49 GHz frequency bandwidth. Then the data receiver receives the third part of data subframes on the 2.41 GHz~2.43 GHz frequency bandwidth, the second part of data subframes on the 2.44 GHz~2.46 GHz frequency bandwidth, and the first part of data subframes on the 2.47 GHz~2.49 GHz frequency bandwidth, and decodes the data subframes based on the reverse sequence of receiving each part of data subframes and the numbering sequence of each part of data subframes.

In an implementation manner, after the data receiver receives the data subframes from the data transmitter, the data receiver decodes the data subframes. When the decoding fails, a failure feedback message of decoding a data subframe may be fed back to the data transmitter. The failure feedback message of decoding the data subframe includes the initial-transmission SN of the data subframe that failed to be decoded. So that the data transmitter carries the initial-transmission SN of the data subframe when retransmitting the data subframe that failed to be decoded to the data receiver.

In the method for transmitting data, in which the one or more frequency bands for transmitting data subframes in a plurality of data frames to be transmitted successively include the same frequency band with different frequency bandwidths, according to some embodiments, the method further includes the following.

In 1130, a failure feedback message of decoding a data subframe is transmitted in response to failing to decode the data subframe.

In the disclosure, the failure feedback message includes an initial-transmission SN of the data subframe that failed to be decoded, so that the retransmitted data subframe has the same SN as the initial-transmission data subframe.

It should be understood that the content shown by the dotted line in FIG. 11 is an optional action.

Figure 12:
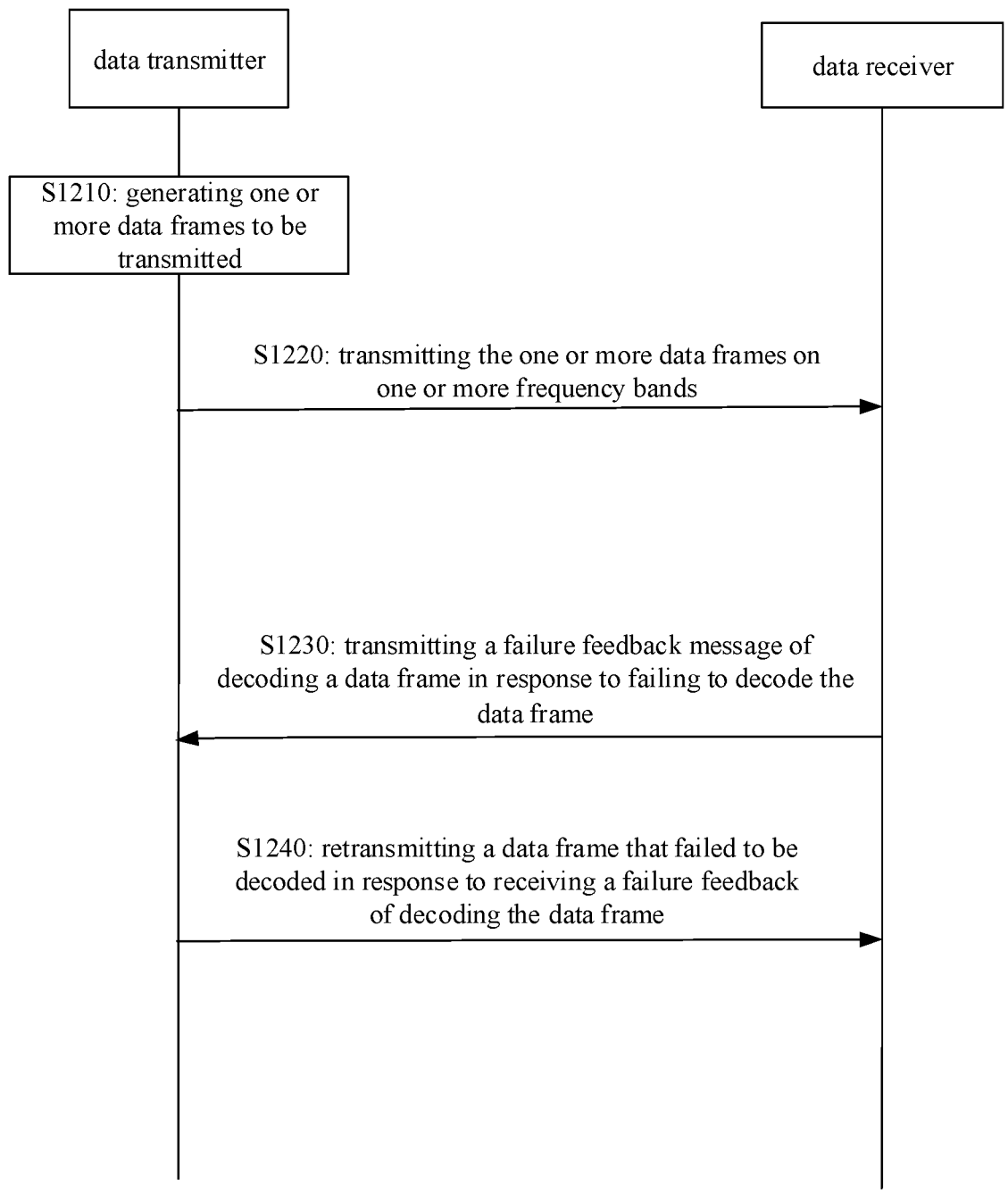
FIG. 12 is a diagram illustrating a method for transmitting data, applicable to a data transmitter and a data receiver, according to some embodiments.

FIG. 12 is a diagram illustrating a method for transmitting data, applicable to a data transmitter and a data receiver, according to some embodiments. As illustrated in FIG. 12, the method for transmitting data is applicable to an interaction process between the data transmitter and the data receiver, and includes the following.

In S1210, the data transmitter generates one or more data frames to be transmitted.

The one or more data frames to be transmitted, generated by the data transmitter, include a single data frame or a plurality of data frames to be transmitted successively.

In S1220, the data transmitter transmits the one or more data frames on one or more frequency bands. The data receiver receives the one or more data frames on the one or more frequency bands.

In the disclosure, the data transmitter transmits the one or more data frames on the one or more frequency bands by an order of frequencies from high to low or from low to high. The data receiver receives the one or more data frames on the one or more frequency bands by an order of frequencies from high to low or from low to high.

In the disclosure, if the data receiver fails to decode the received data frame, S1130 may be performed.

In S1230, if the data receiver fails to decode a data frame, it transmits a failure feedback message of decoding the data frame. The data transmitter receives the failure feedback message of decoding the data frame from the data receiver.

In the disclosure, when the decoding of the data frame fails, the failure feedback message of decoding the data frame is fed back according to the type of the data frame of the decoding failure. For example, when the data frame is a single data frame, if the data receiver fails to decode a data block, a failure feedback message of decoding the data block is transmitted to the data transmitter. When the data frame is a plurality of data frames, if the data receiver fails to decode a data subframe, a failure feedback message of decoding the data subframe is transmitted.

In S1240, when the data transmitter receives the failure feedback message of decoding the data frame, the data frame that failed to be decoded is retransmitted.

In the disclosure, when the data transmitter receives the failure feedback message of decoding the data block, it retransmits the data block that has failed to be decoded.

When the data transmitter receives the failure feedback message of decoding the data subframe, it retransmits the data subframe that failed to be decoded.

In one embodiment, a manner for transmitting data blocks in the single data frame may be a method for transmitting data with a plurality of frequency bands with different frequencies, which is applicable to an interaction process between the data transmitter and the data receiver. A method for transmitting data, in which the one or more frequency bands for transmitting the data blocks in the single data frame include a plurality of frequency bands with different frequencies, according to some embodiments, may include the following. The data transmitter generates a single data frame to be transmitted is generated. The data transmitter sequentially transmits the data blocks in the single data frame on the plurality of frequency bands by an order of frequencies from high to low or from low to high, different frequency bands for transmitting different data blocks. The data receiver receives the data blocks in the single data frame sequentially on the plurality of frequency bands by an order of frequencies from high to low or from low to high. The data receiver sequentially decodes the received one or more data frames on the plurality of frequency bands by an order of frequencies from high to low or from low to high. If the data receiver fails to decode a data block, it transmits a failure feedback message of decoding the data block to the data transmitter. When the data transmitter receives the failure feedback message of decoding the data block, it retransmits the data block that failed to be decoded.

In another embodiment, a manner for transmitting data blocks in the single data frame may be a method for transmitting data with the same frequency band with different frequency bandwidths, which is applicable to an interaction process between the data transmitter and the data receiver. A method for transmitting data, in which the one or more frequency bands for transmitting the data blocks in the single data frame include the same frequency band with different frequency bandwidths, may include the following. The data transmitter generates a single data frame to be transmitted is generated. The data transmitter sequentially transmits the data blocks in the single data frame on different frequency bandwidths in the same frequency band by an order of bandwidth frequencies from high to low or from low to high, different frequency bandwidths for transmitting different data blocks. The data receiver receives the data blocks in the single data frame sequentially on the one frequency band by different frequency bandwidths by an order of bandwidth frequencies from high to low or from low to high. The data receiver sequentially decodes the received one or more data frames on the one frequency band by an order of bandwidth frequencies from high to low or from low to high. If the data receiver fails to decode a data block, it transmits a failure feedback message of decoding the data block to the data transmitter. When the data transmitter receives the failure feedback message of decoding the data block, it retransmits the data block that failed to be decoded.

In another embodiment, a manner for transmitting data subframes in a plurality of data frames to be transmitted successively may be a method for transmitting data with a plurality of frequency bands with different frequencies, which is applicable to an interaction process between the data transmitter and the data receiver. A method for transmitting data, in which the one or more frequency bands for transmitting the data subframes in the plurality of data frames to be transmitted successively include a plurality of frequency bands with different frequencies, according to some embodiments, may include the following. The data transmitter generates a plurality of data frames to be transmitted. The data transmitter sequentially transmits data subframes with subframe serial numbers on the plurality of frequency bands by an order of frequencies from high to low or from low to high. The data receiver receives sequentially the data subframes with subframe serial numbers on the plurality of frequency bands by an order of frequencies from high to low or from low to high. The data receiver sequentially decodes parts of the received data subframes on the plurality of frequency bands by an order of frequencies from high to low or from low to high. If the data receiver fails to decode a data subframe, it transmits a failure feedback message of decoding the data subframe to the data transmitter. When the data transmitter receives the failure feedback message of decoding the data subframe, it retransmits the data subframe that failed to be decoded.

In another embodiment, a manner for transmitting data subframes in a plurality of data frames to be transmitted successively may be a method for transmitting data with the same frequency band with different frequency bandwidths, which is applicable to an interaction process between the data transmitter and the data receiver. A method for transmitting data, in which the one or more frequency bands for transmitting data subframes in a plurality of data frames to be transmitted successively include the same frequency band with different frequency bandwidths, according to some embodiments, may include the following. The data transmitter generates a plurality of data frames to be transmitted. The data transmitter sequentially transmits data subframes with subframe serial numbers on different frequency bandwidths in the same frequency band by an order of bandwidth frequencies from high to low or from low to high. The data receiver receives sequentially data subframes with subframe serial numbers on different frequency bandwidths in the same frequency band by an order of bandwidth frequencies from high to low or from low to high. The data receiver sequentially decodes parts of the received data subframes on different frequency bandwidths in the same frequency band by an order of bandwidth frequencies from high to low or from low to high. If the data receiver fails to decode a data subframe, it transmits a failure feedback message of decoding the data subframe to the data transmitter. When the data transmitter receives the failure feedback message of decoding the data subframe, it retransmits the data subframe that failed to be decoded.

Based on the same concept, the disclosure also provides an apparatus for transmitting data.

Figure 13:
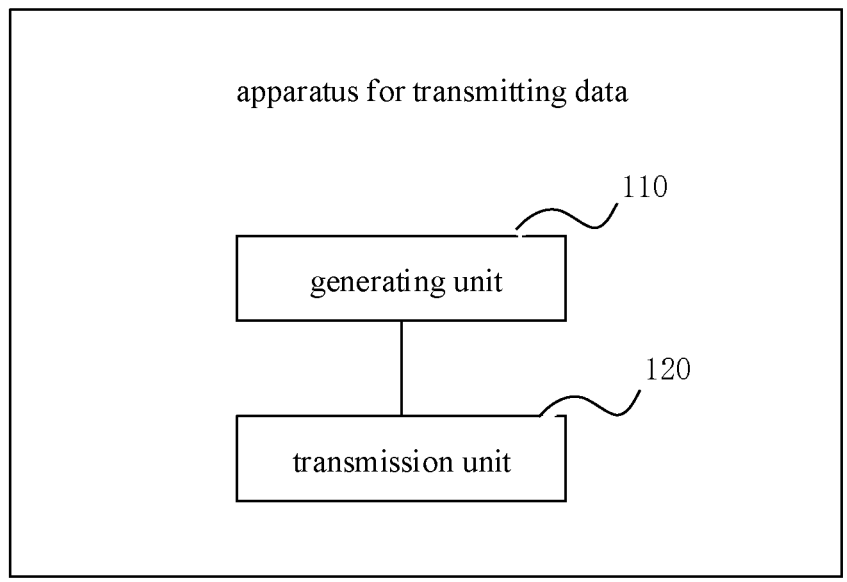
FIG. 13 is a block diagram illustrating an apparatus for transmitting data according to some embodiments.

FIG. 13 is a block diagram illustrating an apparatus for transmitting data according to some embodiments. Referring to FIG. 13, the apparatus is applicable to the data transmitter and includes a generating unit 110 and a transmission unit 120.

The generating unit 110 is configured to generate one or more data frames to be transmitted.

The transmission unit 120 is configured to transmit the one or more data frames on one or more frequency bands, in which the one or more frequency bands have the same sequence number and the sequence number is configured to identify the one or more data frames.

In some embodiments, the one or more data frames includes a single data frame.

The transmission unit 120 is configured to transmit the one or more data frames on the one or more frequency bands by the following action.

Transmitting data blocks with the same sequence number in the single data frame on the one or more frequency bands.

In some embodiments, the one or more frequency bands for transmitting the data blocks in the single data frame includes a plurality of frequency bands with different frequencies.

The transmission unit 120 is configured to transmit the data blocks with the same sequence number in the single data frame on the one or more frequency bands by the following action.

Sequentially transmitting the data blocks in the single data frame on the plurality of frequency bands by an order of frequencies from high to low or from low to high, different frequency bands for transmitting different data blocks.

In some embodiments, the one or more frequency bands for transmitting the data blocks in the single data frame includes the same frequency band with different frequency bandwidths.

The transmission unit 120 is configured to transmit the data blocks with the same sequence number in the single data frame on the one or more frequency bands by the following action.

Sequentially transmitting the data blocks in the single data frame on different frequency bandwidths in the same frequency band by an order of bandwidth frequencies from high to low or from low to high, different frequency bandwidths for transmitting different data blocks.

Figure 14:
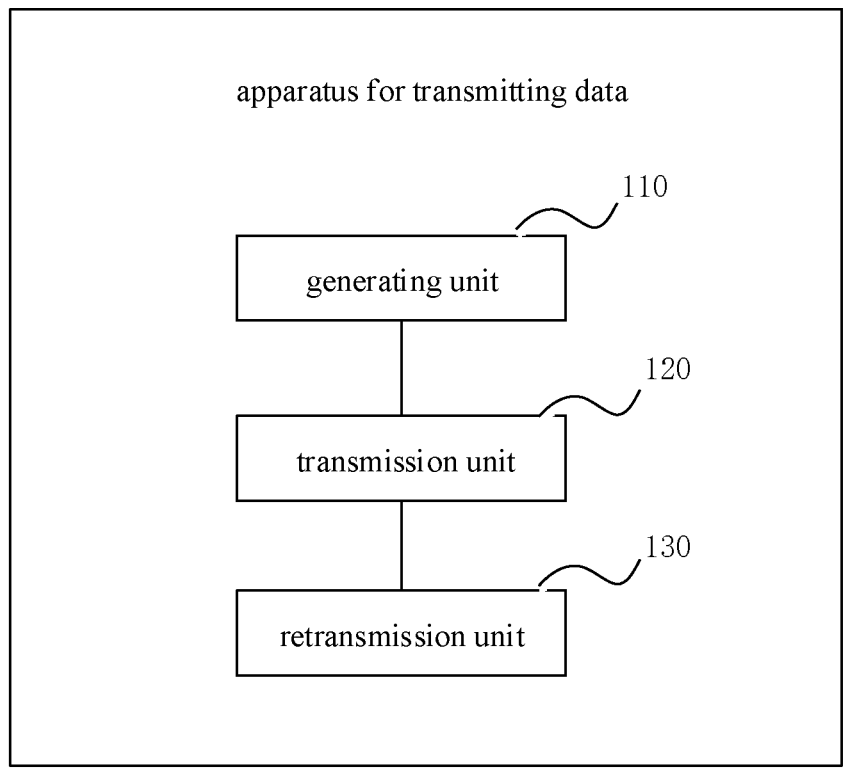
FIG. 14 is a block diagram illustrating another apparatus for transmitting data according to some embodiments.

The apparatus for transmitting data applicable to the data transmitter further includes a retransmission unit 130, as illustrated in FIG. 14. FIG. 14 is a block diagram illustrating another apparatus for transmitting data according to some embodiments. The retransmission unit 130 is configured to retransmit a data block that failed to be decoded in response to receiving a failure feedback of decoding the data block, the retransmitted data block having the same sequence number as the data block that is initially transmitted.

In some embodiments, the one or more data frames includes a plurality of data frames to be transmitted successively.

The transmission unit 120 is configured to transmit the one or more data frames on the one or more frequency bands by the following action.

Transmitting data subframes with the same sequence number in the plurality of data frames on the one or more frequency bands, the data subframe has a corresponding subframe serial number.

In some embodiments, the one or more frequency bands for transmitting the data subframes includes a plurality of frequency bands with different frequencies.

The transmission unit 120 is configured to transmit the data subframes with the same sequence number in the plurality of data frames on the one or more frequency bands.

Sequentially transmitting the data subframes with the subframe serial numbers on the plurality of frequency bands by an order of frequencies from high to low or from low to high, in which data subframes with successive subframe serial numbers are transmitted in each of the frequency bands.

In some embodiments, the one or more frequency bands for transmitting the data subframes includes the same frequency band with different frequency bandwidths.

The transmission unit 120 is configured to transmit the data subframes with the same sequence number in the plurality of data frames on the one or more frequency bands by the following action.

Sequentially transmitting the data subframes with the subframe serial numbers on the different frequency bandwidths in the same frequency band by an order of bandwidth frequencies from high to low or from low to high, in which data subframes with successive subframe serial numbers are transmitted in each of the frequency bandwidths.

Figure 15:
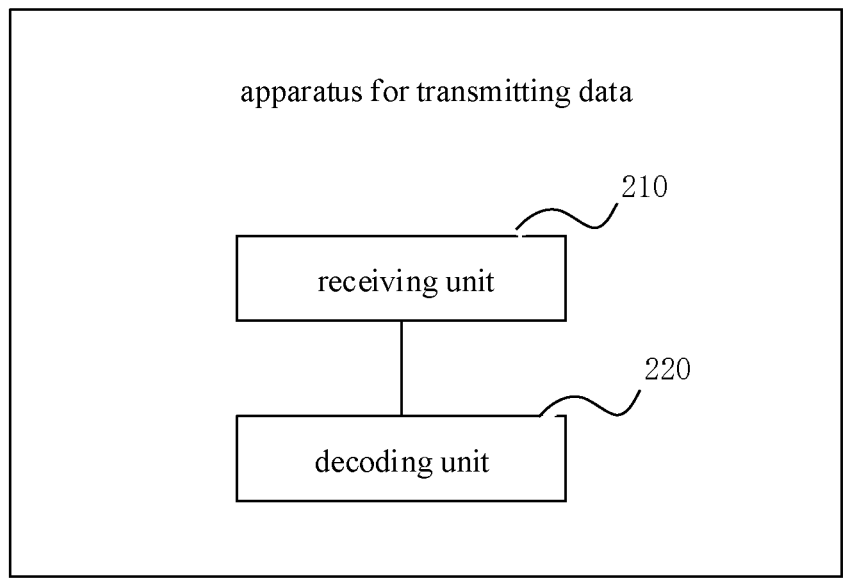
FIG. 15 is a block diagram illustrating still another apparatus for transmitting data according to some embodiments.

FIG. 15 is a block diagram illustrating still another apparatus for transmitting data according to some embodiments. Referring to FIG. 15, the apparatus is applicable to the data receiver and includes a receiving unit 210 and a decoding unit 220.

The receiving unit 210 is configured to receive one or more data frames on one or more frequency bands, in which the one or more frequency bands have the same sequence number and the sequence number is configured to identify the one or more data frames.

The decoding unit 220 is configured to sequentially decode the received one or more data frames on the one or more frequency bands by an order of frequencies from high to low or from low to high.

In some embodiments, the one or more data frames includes a single data frame.

The receiving unit 210 is configured to receive the one or more data frames on the one or more frequency bands by the following action.

Receiving data blocks in the single data frame on the one or more frequency bands.

In some embodiments, the one or more frequency bands for receiving the data blocks in the single data frame includes a plurality of frequency bands with different frequencies.

The receiving unit 210 is configured to receive the data blocks in the single data frame on the one or more frequency bands by the following action.

Sequentially receiving the data blocks in the single data frame on the plurality of frequency bands by an order of frequencies from high to low or from low to high.

In some embodiments, the one or more frequency bands for receiving the data blocks in the single data frame includes the same frequency band with different frequency bandwidths.

The receiving unit 210 is configured to receive the data blocks in the single data frame on the one or more frequency bands by the following action.

Sequentially receiving the data blocks in the single data frame on the one frequency band by different frequency bandwidths by an order of bandwidth frequencies from high to low or from low to high.

Figure 16:
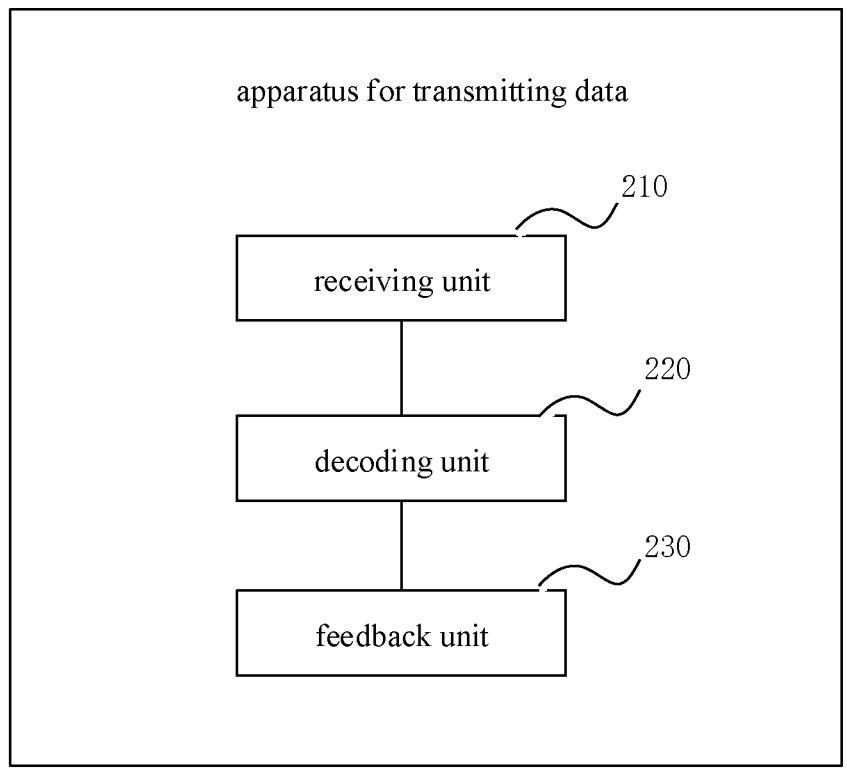
FIG. 16 is a block diagram illustrating yet still another apparatus for transmitting data according to some embodiments.

The apparatus for transmitting data applicable to the data receiver further includes a feedback unit 230, as illustrated in FIG. 16. FIG. 16 is a block diagram illustrating yet still another apparatus for transmitting data according to some embodiments. The feedback unit 230 is configured to transmit a failure feedback message of decoding a data block in response to failing to decode the data block, the failure feedback message including an initial-transmission sequence number of the data block that failed to be decoded.

In some embodiments, the one or more data frames includes a plurality of data frames to be transmitted successively.

The receiving unit 210 is configured to receive the one or more data frames on the one or more frequency bands by the following action.

Receiving data subframes in the plurality of data frames on the one or more frequency bands, the data subframe has a corresponding subframe serial number In some embodiments, the one or more frequency bands for receiving the data subframes includes a plurality of frequency bands with different frequencies.

The receiving unit 210 is configured to receive the one or more data frames on the one or more frequency bands by the following action.

Sequentially receiving the data subframes with the subframe serial numbers on the plurality of frequency bands by an order of frequencies from high to low or from low to high, in which data subframes with successive subframe serial numbers are received in each of the frequency bands.

In some embodiments, the one or more frequency bands for receiving the data subframes includes the same frequency band with different frequency bandwidths.

The receiving unit 210 is configured to receive the one or more data frames on the one or more frequency bands by the following action.

Sequentially receiving the data subframes with the subframe serial numbers on the different frequency bandwidths in the same frequency band by an order of bandwidth frequencies from high to low or from low to high, in which data subframes with successive subframe serial numbers are received in each of the frequency bandwidths.

In some embodiments, the feedback unit 230 is configured to transmit a failure feedback message of decoding a data subframe in response to failing to decode the data subframe, the failure feedback message including an initial-transmission sequence number of the data subframe that failed to be decoded.

With respect to the apparatuses in the above embodiments, the specific manners for performing operations for individual modules therein have been described in detail in the embodiments regarding the methods, which will not be elaborated herein.

Figure 17:
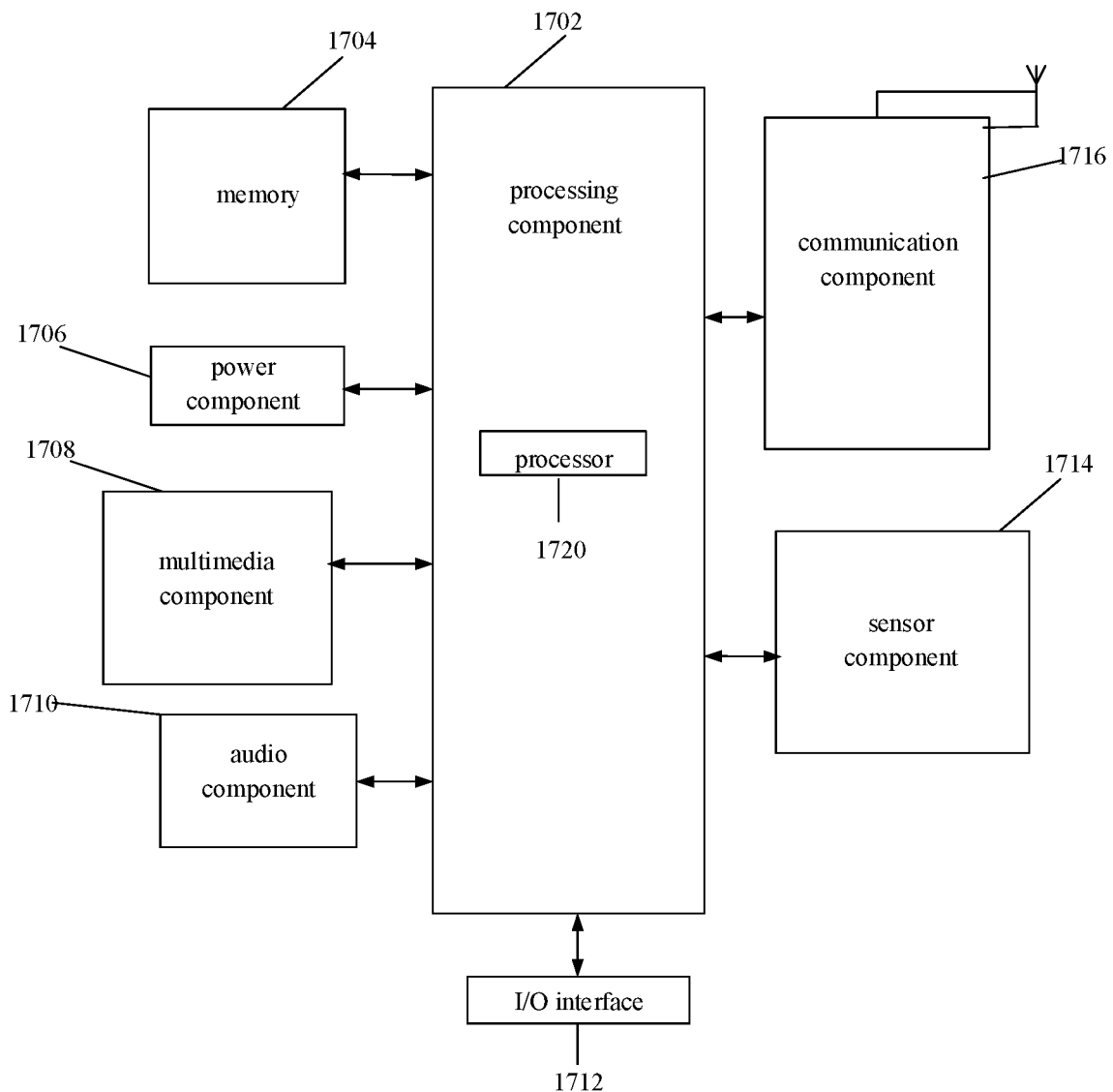
FIG. 17 is a block diagram illustrating a device according to some embodiments.

FIG. 17 is a block diagram of a device 1700 for transmitting data according to some embodiments. For example, the device 1700 may be a mobile phone, a computer, a digital broadcast terminal, a messaging device, a gaming console, a tablet, a medical device, exercise equipment, a personal digital assistant, and the like.

Referring to FIG. 17, the device 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the device 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

In some embodiments, the multimedia component 1708 includes a front camera and/or a rear camera. The front camera and the rear camera may receive an external multimedia datum while the device 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone ("MIC") configured to receive an external audio signal when the device 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the device 1700. For instance, the sensor component 1714 may detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the device 1700 and other devices. The device 1700 can access a wireless network based on a communication standard, such as WiFi, 2G, or 3G, or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1704, executable by the processor 1720 in the device 1700, for performing the above-described methods. For example, the non-transitory computer-readable storage medium may be a ROM, a RAM, a CD-ROM, a magnetic tape, a floppy disc, an optical data storage device, and the like.

Figure 18:
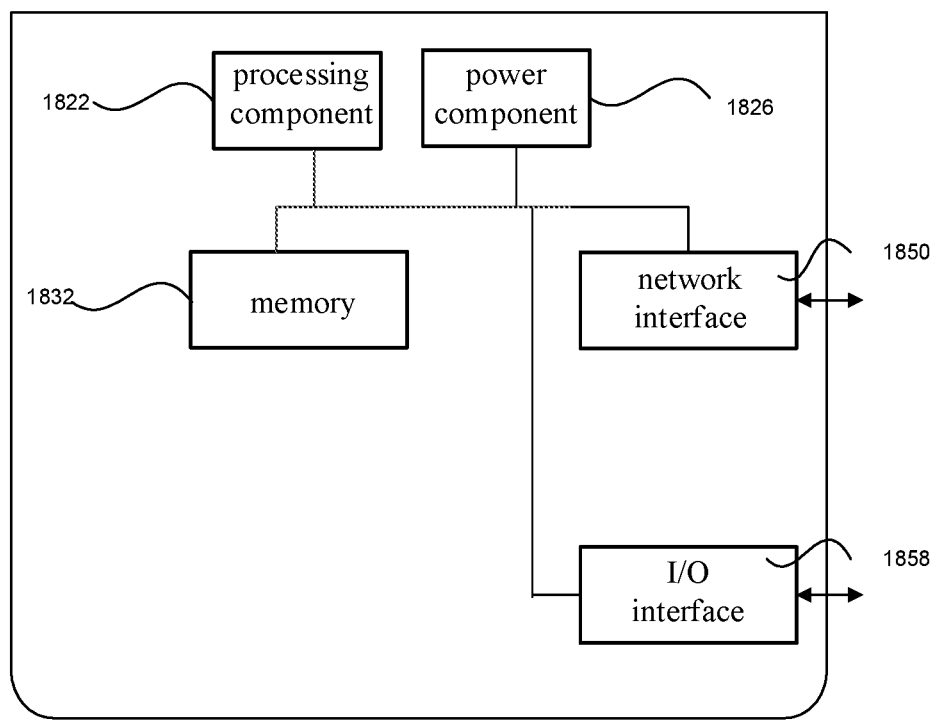
FIG. 18 is a block diagram illustrating a device according to some embodiments.

FIG. 18 is a block diagram illustrating a device for storing data according to some embodiments. For example, the device may be provided as a server. Referring to FIG. 18, the device includes a processing component 1822, which further includes one or more processors, and a memory resource represented by a memory 1832 for storing instructions that may be executed by the processing component 1822, such as application programs. The application program stored in the memory 1832 may include one or more modules each corresponding to a set of instructions. In addition, the processing component 1822 is configured to execute instructions to perform the above method.

The device 1800 may also include a power component 1826 configured to perform power management of the device, a wired or wireless network interface 1850 configured to connect the device to the network, and an input output (I/O) interface 1858. The device may operate based on an operating system stored in the memory 1832, such as Windows Server™, Mac OS X™, Unix™, Linux™, FreeBSD™ or the like.

It should be understood that "plurality" or "multiple" mentioned in the disclosure may refer to one or more, and other quantifiers are similar. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It may be further understood that although operations in the embodiments of the disclosure are described in a specific order in the drawings, they should not be understood as requiring these operations to be performed in the specific order shown or in a serial order, or requiring to perform all the operations shown to obtain the desired result. In certain circumstances, multitasking and parallel processing may be advantageous.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting data, comprising:
   generating one or more data frames to be transmitted; and
   transmitting the one or more data frames on one or more frequency bands, wherein the one or more frequency bands have the same sequence number and the sequence number is configured to identify the one or more data frames,
   in response to a number of the one or more data frames being more than one and the more than one data frame being transmitted successively, transmitting the one or more data frames on the one or more frequency bands comprising:
   transmitting data subframes with the same sequence number in the more than one data frame on the one or more frequency bands, in which the data subframe has a corresponding subframe serial number.

2. The method as claimed in claim 1,
   wherein transmitting the one or more data frames on the one or more frequency bands in response to the number of the one or more data frames being one comprises:
   transmitting data blocks with the same sequence number in the one data frame on the one or more frequency bands.

3. The method as claimed in claim 2, wherein the one or more frequency bands comprises a plurality of frequency bands with different frequencies, and
   wherein transmitting the data blocks with the same sequence number in the one data frame on the one or more frequency bands comprises:
   sequentially transmitting the data blocks in the one data frame on the plurality of frequency bands by an order of frequencies from high to low or from low to high, wherein different frequency bands are for transmitting different data blocks.

4. The method as claimed in claim 2, wherein the one or more frequency bands comprises the same frequency band with different frequency bandwidths; and
   wherein transmitting the data blocks with the same sequence number in the one data frame on the one or more frequency bands comprises:
   sequentially transmitting the data blocks in the one data frame on different frequency bandwidths in the same frequency band by an order of bandwidth frequencies from high to low or from low to high, wherein different frequency bandwidths are for transmitting different data blocks.

5. The method as claimed in claim 2, further comprising:
   retransmitting a data block that failed to be decoded in response to receiving a failure feedback of decoding the data block, the retransmitted data block having the same sequence number as the data block that is initially transmitted.

6. The method as claimed in claim 1, wherein the one or more frequency bands comprises a plurality of frequency bands with different frequencies, and
- wherein transmitting the data subframes with the same sequence number in the more than one of data frame on the one or more frequency bands comprises:
- sequentially transmitting the data subframes with the subframe serial numbers on the plurality of frequency bands by an order of frequencies from high to low or from low to high, wherein data subframes with successive subframe serial numbers are transmitted in each of the frequency bands.

7. The method as claimed in claim 1, wherein the one or more frequency bands comprises the same frequency band with different frequency bandwidths; and
- wherein transmitting the data subframes with the same sequence number in the more than one data frame on the one or more frequency bands comprises:
- sequentially transmitting the data subframes with the subframe serial numbers on the different frequency bandwidths in the same frequency band by an order of bandwidth frequencies from high to low or from low to high, wherein data subframes with successive subframe serial numbers are transmitted in each of the frequency bandwidths.

8. The method as claimed in claim 1, further comprising:
retransmitting a data subframe that failed to be decoded in response to receiving a failure feedback of decoding the data subframe, the retransmitted data subframe having the same sequence number as the data subframe that is initially transmitted.

9. A method for transmitting data, comprising:
receiving one or more data frames on one or more frequency bands, wherein the one or more frequency bands have the same sequence number and the sequence number is configured to identify the one or more data frames; and
sequentially decoding the received one or more data frames on the one or more frequency bands by an order of frequencies from high to low or from low to high.

10. The method as claimed in claim 9, wherein a number of the one or more data frames is one, and
- wherein receiving the one or more data frames on the one or more frequency bands comprises:
- receiving data blocks in the one data frame on the one or more frequency bands.

11. The method as claimed in claim 10, wherein the one or more frequency bands comprises a plurality of frequency bands with different frequencies, and
- wherein receiving the data blocks in the one data frame on the one or more frequency bands comprises:
- sequentially receiving the data blocks in the one data frame on the plurality of frequency bands by an order of frequencies from high to low or from low to high.

12. The method as claimed in claim 10, wherein the one or more frequency bands comprises the same frequency band with different frequency bandwidths; and
- wherein receiving the data blocks in the one data frame on the one or more frequency bands comprises:
- sequentially receiving the data blocks in the one data frame on the one frequency band by different frequency bandwidths by an order of bandwidth frequencies from high to low or from low to high.

13. The method as claimed in claim 10, further comprising:
transmitting a failure feedback message of decoding a data block in response to failing to decode the data block, the failure feedback message comprising an initial-transmission sequence number of the data block that failed to be decoded.

14. The method as claimed in claim 9, wherein a number of the one or more data frames is more than one, the more than one data frames are transmitted successively, and
- wherein receiving the one or more data frames on the one or more frequency bands comprises:
- receiving data subframes in the more than one data frames on the one or more frequency bands, the data subframe has a corresponding subframe serial number.

15. The method as claimed in claim 14, wherein the one or more frequency bands comprises a plurality of frequency bands with different frequencies, and
- wherein receiving the data subframes in the more than one data frames on the one or more frequency bands comprises:
- sequentially receiving the data subframes with the subframe serial numbers on the plurality of frequency bands by an order of frequencies from high to low or from low to high, wherein data subframes with successive subframe serial numbers are received in each of the frequency bands.

16. The method as claimed in claim 14, wherein the one or more frequency bands comprises the same frequency band with different frequency bandwidths; and
- wherein receiving the data subframes in the more than one data frames on the one or more frequency bands comprises:
- sequentially receiving the data subframes with the subframe serial numbers on the different frequency bandwidths in the same frequency band by an order of bandwidth frequencies from high to low or from low to high, wherein data subframes with successive subframe serial numbers are received in each of the frequency bandwidths.

17. The method as claimed in claim 14, further comprising:
transmitting a failure feedback message of decoding a data subframe in response to failing to decode the data subframe, the failure feedback message comprising an initial-transmission sequence number of the data subframe that failed to be decoded.

18. A device for transmitting data, comprising:
a processor; and
a memory for storing instructions executable by the processor;
wherein the processor is configured to:
generate one or more data frames to be transmitted; and
transmit the one or more data frames on one or more frequency bands, wherein the one or more frequency bands have the same sequence number and the sequence number is configured to identify the one or more data frames,
in response to a number of the one or more data frames being more than one and the more than one data frame being transmitted successively,
the processor being configured to transmit the one or more data frames on the one or more frequency bands by:
transmitting data subframes with the same sequence number in the more than one data frame on the one or more frequency bands, in which the data subframe has a corresponding subframe serial number.

19. A device for transmitting data, comprising:
a processor; and
a memory for storing instructions executable by the processor;

wherein the processor is configured to perform the method for transmitting data as claimed in claim 10.

* * * * *